US007785220B2

(12) United States Patent
Ciavaglia et al.

(10) Patent No.: US 7,785,220 B2
(45) Date of Patent: Aug. 31, 2010

(54) ADJUSTABLE PULLEY ASSEMBLY AND DRIVE UNIT HAVING AN ADJUSTABLE PULLEY ASSEMBLY FOR AN ENDLESS FLEXIBLE DRIVE MEMBER OF THE DRIVE UNIT

(75) Inventors: Michael A. Ciavaglia, Dearborn, MI (US); Lloyd W. Rogers, Jr., Shelby Township, MI (US); Howard W. Kuhlman, Rochester Hills, MI (US); Brian N. Orr, Chesterfield, MI (US); Eric R. Hansen, Lake Orion, MI (US); John R. Rice, Marshall, IL (US); Joseph M. Johnson, Huntington Woods, MI (US)

(73) Assignee: Strattec Power Access LLC, Glendale, WI (US)

( * ) Notice: Subject to any disclaimer, the term of this patent is extended or adjusted under 35 U.S.C. 154(b) by 809 days.

(21) Appl. No.: 11/217,113

(22) Filed: Aug. 31, 2005

(65) Prior Publication Data

US 2006/0071505 A1 Apr. 6, 2006

Related U.S. Application Data

(60) Provisional application No. 60/616,259, filed on Oct. 6, 2004.

(51) Int. Cl.
*B60J 5/10* (2006.01)
*E05F 15/12* (2006.01)

(52) U.S. Cl. ....................... 474/112; 474/101; 474/116; 474/135; 474/199; 474/206; 49/340; 49/341; 49/349; 384/255; 384/447

(58) Field of Classification Search ................. 474/112, 474/135, 114, 141; 296/146; 49/340, 349, 49/341, 342, 344; 384/255
See application file for complete search history.

(56) References Cited

U.S. PATENT DOCUMENTS

| | | | | | |
|---|---|---|---|---|---|
| 1,218,686 | A | * | 3/1917 | Morse | 474/112 |
| 3,148,893 | A | * | 9/1964 | Cole et al. | 280/434 |
| 3,733,919 | A | * | 5/1973 | Rupp, II | 474/112 |
| 4,237,744 | A | * | 12/1980 | Jolly | 474/116 |
| 4,541,502 | A | * | 9/1985 | Iwai et al. | 180/217 |
| 5,676,615 | A | * | 10/1997 | McGrath et al. | 474/112 |
| 6,367,199 | B2 | | 4/2002 | Sedlak et al. | |

(Continued)

*Primary Examiner*—Robert A Siconolfi
*Assistant Examiner*—San Aung
(74) *Attorney, Agent, or Firm*—Michael Best & Friedrich LLP

(57) ABSTRACT

An automotive vehicle has a power operated lift-gate that is opened and closed by two drive units. The typical drive unit has a guide channel, an attachment assembly that is disposed in the guide channel, a flexible drive member that is attached to the attachment assembly and formed in a loop for moving the attachment assembly in the guide channel. The flexible drive member is trained solely around two pulleys at the respective opposite ends of the guide channel to form the flexible drive member in a narrow loop. One of the pulleys is an idler pulley that is part of an adjustable pulley assembly and the other pulley is driven by a power unit that is attached to the guide channel. The adjustable pulley assembly adjusts the distance between the pulleys to take up slack in the flexible drive member.

17 Claims, 4 Drawing Sheets

U.S. PATENT DOCUMENTS 6,367,964 B1 4/2002 Schmelz et al.
6,453,614 B1 9/2002 Rogers, Jr. et al.
2003/0136054 A1* 7/2003 Daniels et al. ................ 49/340
2004/0172883 A1* 9/2004 Rogers et al. ................ 49/341

* cited by examiner

ADJUSTABLE PULLEY ASSEMBLY AND DRIVE UNIT HAVING AN ADJUSTABLE PULLEY ASSEMBLY FOR AN ENDLESS FLEXIBLE DRIVE MEMBER OF THE DRIVE UNIT

RELATED APPLICATIONS

This patent application claims priority of U.S. Provisional Patent Application 60/616,259 filed Oct. 6, 2004.

FIELD OF THE INVENTION

This invention relates to an adjustable pulley assembly and a drive unit having an endless flexible drive member that is suitable for use in a power operated closure system such as, for example, a power operated lift-gate system in an automotive vehicle.

BACKGROUND OF THE INVENTION

U.S. Pat. No. 6,367,864 B2 granted to Lloyd Walker Rogers, Jr. et al. Apr. 9, 2004 discloses a vehicle having a power operated lift-gate system that includes at least one drive unit. The drive unit comprises a fixed linear guide channel and a follower that moves in the guide channel. A rod is universally connected to the follower at one end and universally connected to the lift-gate at the opposite end. An endless flexible drive member that is attached to the follower wraps part way around two idler pulleys at the opposite ends of the guide channel and travels in a closed loop. The flexible drive member is driven by a bi-directional power unit that includes a drive sprocket. The drive sprocket drivingly engages the loop of the flexible drive member outside the drive channel midway between the two idler pulleys.

SUMMARY OF THE INVENTION

In one aspect, this invention provides a drive unit having an endless flexible drive member that is more compact than the drive unit that is disclosed in the Rogers et al. '864 patent.

In another aspect, this invention provides a compact drive unit that includes an adjustable pulley assembly to take up slack in the flexible drive member.

In yet another aspect this invention provides an adjustable pulley assembly that is unique, compact and economical.

DETAILED DESCRIPTION OF PREFERRED EMBODIMENT

Figure 1:
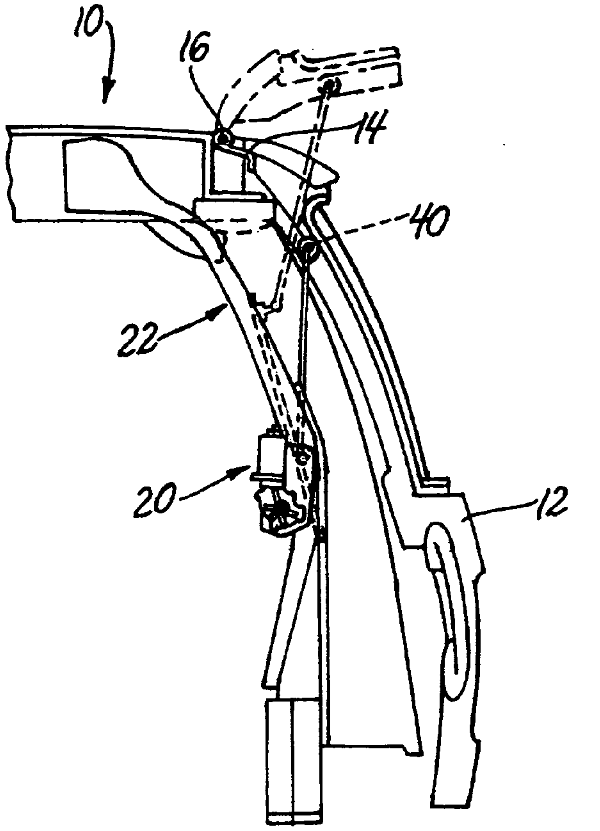
FIG. 1 is a fragmentary rear view of a vehicle equipped with a power operated lift-gate that includes an adjustable pulley assembly and drive unit of the invention.
Figure 2:
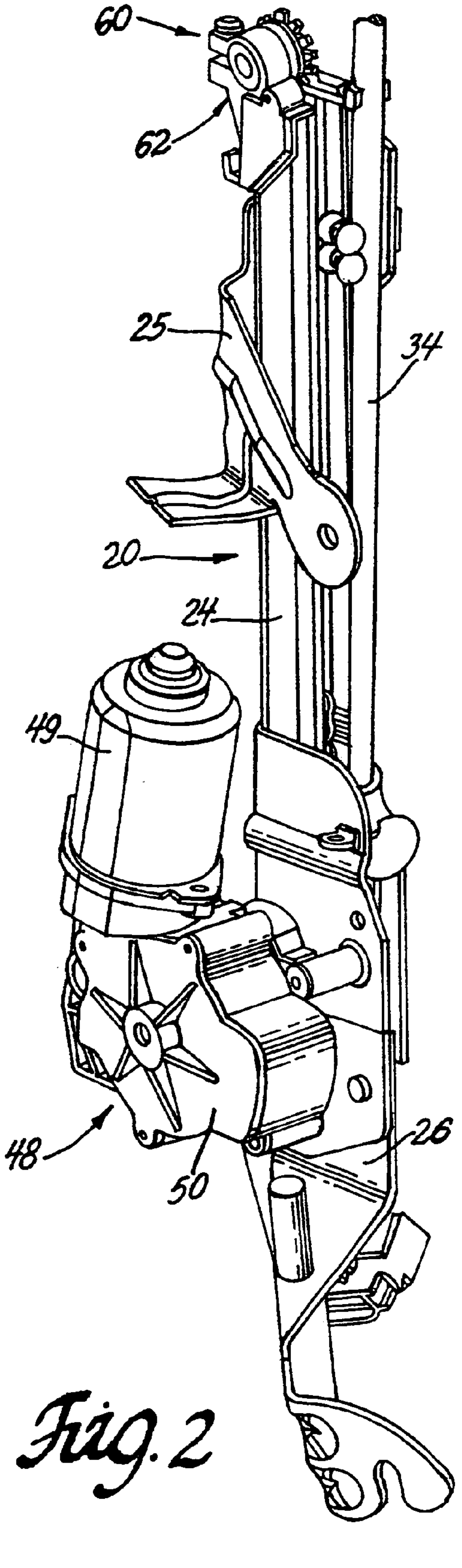
FIG. 2 is a perspective view of the drive unit shown in FIG. 1.
Figure 3:
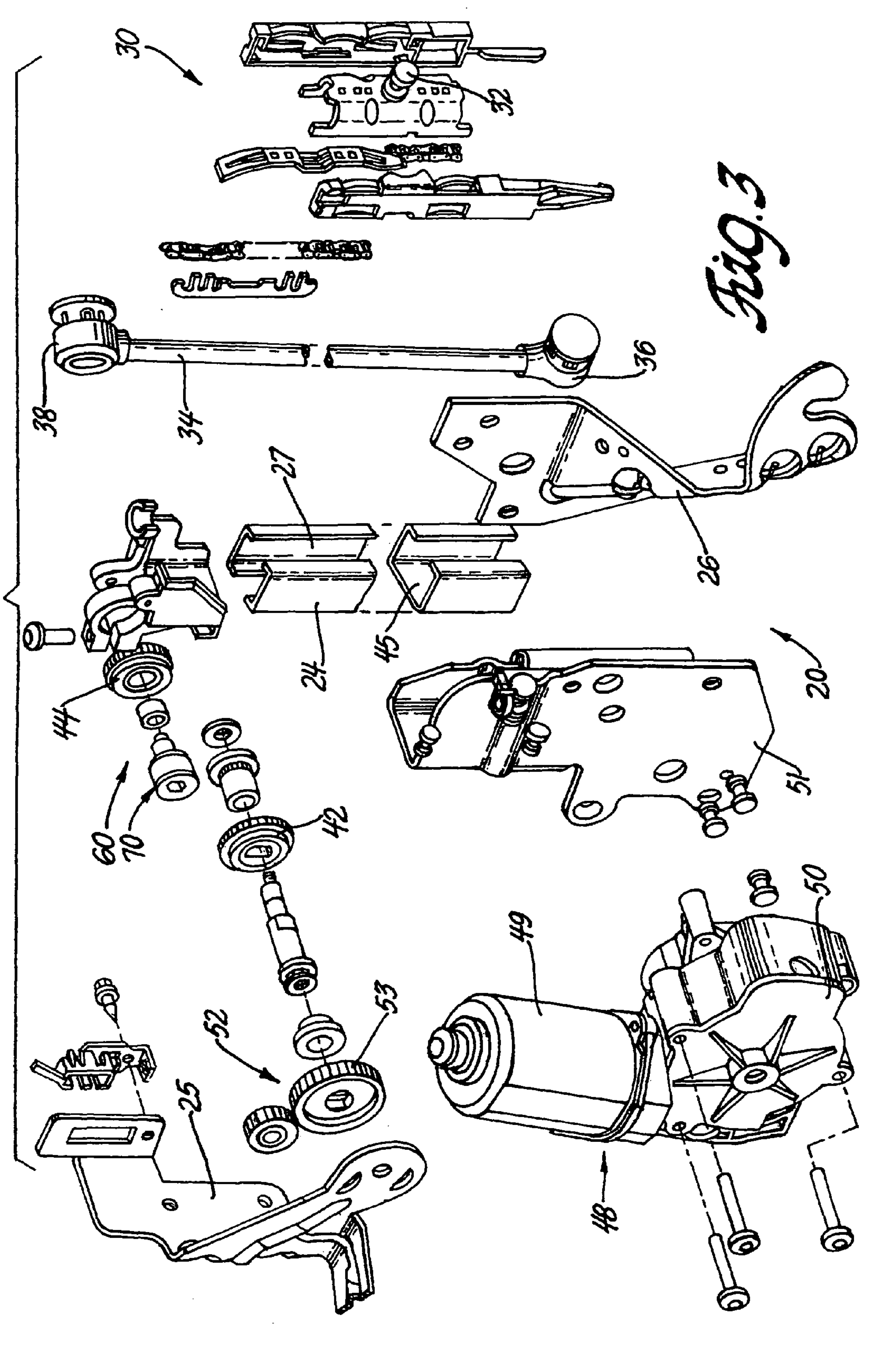
FIG. 3 is a partially exploded perspective view of the drive unit shown in FIG. 2 showing details of the adjustable pulley assembly.
Figure 4:
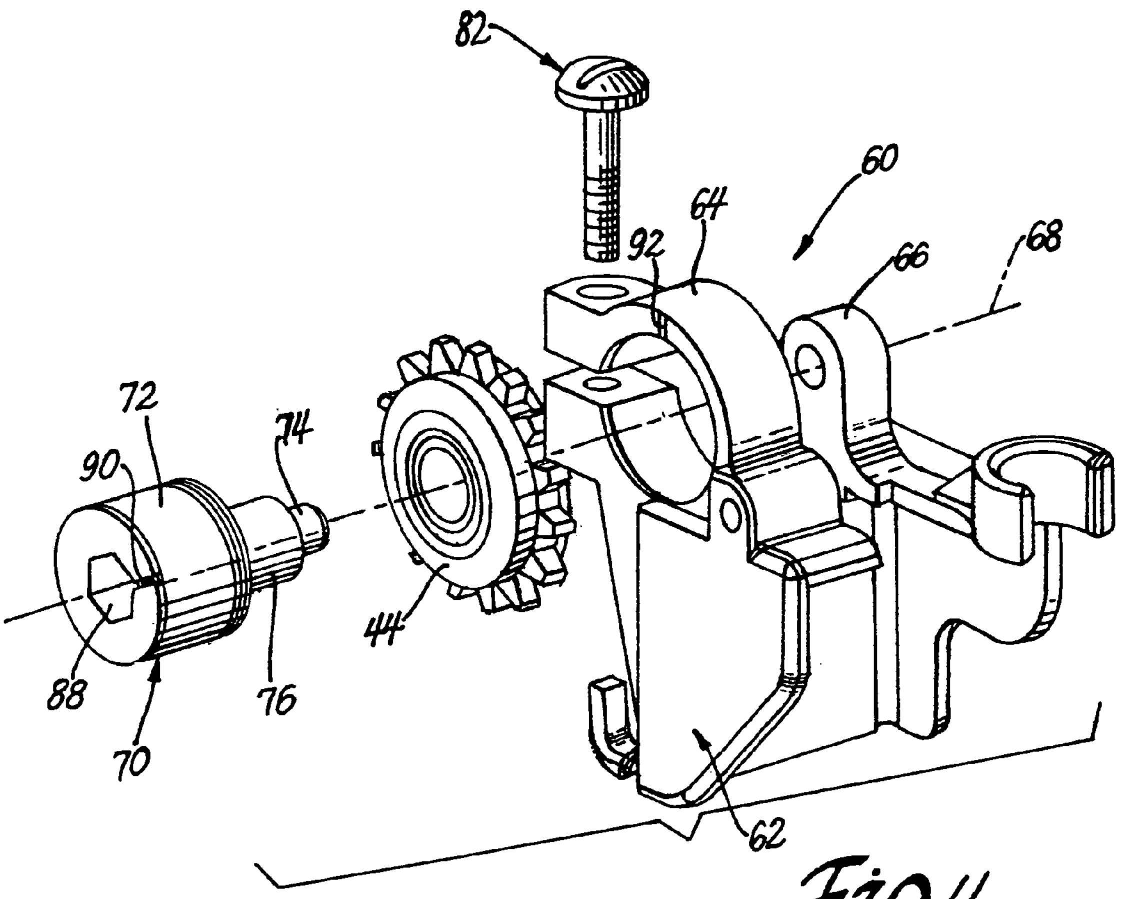
FIG. 4 is an enlarged exploded perspective view of the adjustable pulley assembly shown in FIG. 2.

Referring now to the drawings, vehicle 10 has a closure or lift-gate 12 that is attached to the aft end of the vehicle roof by two hinge assemblies 14. Hinge assemblies 14 have hinge portions that are secured to a roof channel of the vehicle 10 and hinge portions that are secured to lift-gate 12 so that lift-gate 12 pivots about a substantially horizontal hinge axis 16 between a closed position shown in solid line in FIG. 1 and an open position shown in dashed lines in FIG. 1. Lift-gate 12 is generally permitted to pivot about 90° about the substantially horizontal hinge axis 16. However, the range of movement can be varied substantially from one model of vehicle to another.

Lift-gate 12 is opened and closed manually or by a suitable power operated closure system comprising two identical drive units 20 that are installed in the aft end of the vehicle body at the respective vertical body pillars 22, commonly referred to as the D pillars, that define the width of the rear opening that is closed by lift-gate 12. The typical drive unit 20 is shown in greater detail in FIGS. 2 through 6.

Each power unit 20 comprises a fixed rectangular guide channel 24 that is fixed to a body portion of the vehicle in a generally vertical orientation by upper and lower brackets 25 and 26 at or near the D pillar 22.

The rectangular guide channel 24 has an elongated longitudinal slot 27 in a rearward facing wall 28 of the guide channel 24 that faces toward lift-gate 12 when lift-gate 12 is in the closed position.

An attachment assembly 30 is disposed in the guide channel 24 and moves along in the guide channel. Attachment Assembly 30 has a universal connector in the form of a ball stud 32 that projects through slot 27. A rod 34 has a mating universal connector in the form of a socket 36 at one end that receives the ball stud 32 so that rod 34 is universally connected to assembly 30. Rod 34 has a socket 38 at an opposite end that is universally connected to a mating ball stud 40 attached to a side wall of the vehicle lift gate 12. It should be understood that any type of universal connector can be used between rod 34 and attachment assembly 30 at one end of rod 34 and between rod 34 and lift-gate 12 at the other end of rod 34 and that the positions of the ball studs and the sockets of the ball joints 32, 36 and 38, 40 of illustrated example can be reversed.

Figure 5:
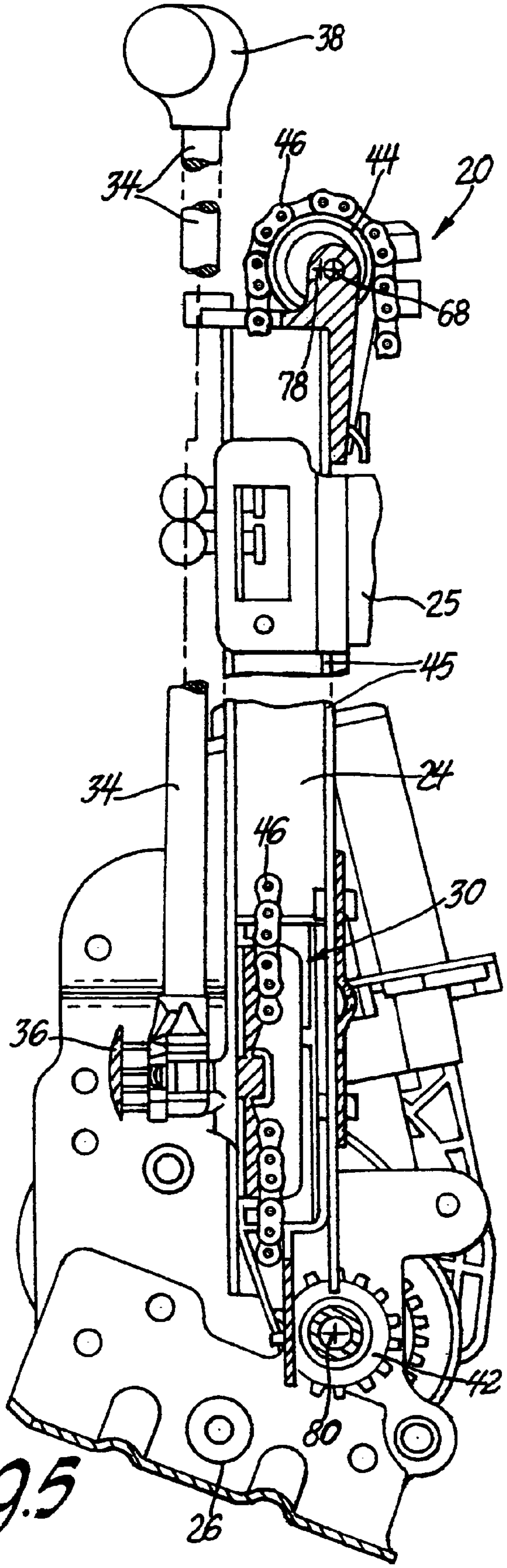
FIG. 5 is a longitudinal section of the drive unit shown in FIG. 2.

Drive unit 20 further comprises a first pulley 42 at a lower end of the guide channel 24 and a second pulley 44 at an upper end of the guide channel. A flexible drive member in the form of a drive chain 46 extends into the upper and lower open ends of guide channel 24. The opposite ends of drive chain 46 are attached to the opposite ends of attachment assembly 30 so that drive chain 46 is in effect, an endless flexible drive member that travels in a loop. The drive chain or flexible drive member 46 is trained solely around pulleys 42 and 44. More specifically drive chain 46 extends up from attachment assembly 30 directly to pulley 44, then wraps substantially 180 degrees around upper pulley 44, then extends directly down to lower pulley 42, then wraps substantially 180 degrees around lower pulley 42 and then extends directly back up to attachment assembly 30 as best shown in FIG. 5. In other words, flexible drive member 46 of drive unit 20 is engaged solely by two pulleys, drive pulley 42 and idler pulley 44 to form the flexible drive member 46 in a narrow loop having a width determined by the diameter of pulleys 42 and 44. Pulleys 42 and 44 preferably have equal diameters. This contributes to a very compact arrangement for drive unit 20. Pulleys 42 and 44 (which are preferably sprockets when a drive chain is used) are aligned with the end wall 45 of rectangular guide channel 24 so that the portions of the drive chain 46 between pulleys 42 and 44 inside as well as outside the guide channel 24 are spaced from the end wall 45.

Drive unit 20 further comprises a bi-directional power unit 48 that is drivingly connected to the lower pulley 42 so that power unit 20 drives drive chain 46 in one direction to move lift-gate 12 to the open position and in an opposite direction to move lift-gate 12 to the closed position. Power unit 48 is drivingly attached to a pulley at one end of the guide channel 24 for efficient packaging. Power unit 48 is preferably drivingly attached to the lower pulley 42 to minimize the intrusion into the load area of the vehicle but may be drivingly attached to the upper pulley 44. In any event, one pulley is a drive pulley while the other pulley is an idler pulley, or in the case of a chain drive unit, one is an idler sprocket while the other is a drive sprocket.

Bi-directional power unit 48 includes a reversible electric motor 49 and preferably an electromagnetic clutch 50 attached to the lower end of the guide channel 24 by a power unit bracket 51. Electromagnetic clutch 50 is driven by reversible electric motor 49 via a suitable gear set and lower pulley (drive sprocket) 42 is driven by electromagnetic clutch 50 through a second suitable gear set 52.

Adjustable Pulley Assembly

As indicated above, drive unit 20 includes a pulley 44 at the upper end of guide channel 24 that is an idler pulley or in the case of a chain drive unit, an idler sprocket. Pulley 44 is part of an adjustable pulley assembly 60 that includes a housing 62 that is attached to the upper end of guide channel 24 as best shown in FIGS. 2 through 6. Housing 62 has a first journal box 64 and a second journal box 66 located on a fixed housing axis 68 that is generally coplanar with or closely parallel to the end wall 45 of the guide channel 24. Journal boxes 64 and 66 are spaced axially from each other to provide space for pulley 44.

Pulley assembly 60 also includes a camshaft 70 having axially spaced concentric bearing portions 72 and 74 that are disposed in the first journal box 64 and the second journal box 64, respectively for rotation about the fixed housing axis 68. Camshaft 70 has a cam 76 between the bearing portions 72 and 74. Cam 76 is circular having a center that defines an adjustable pulley axis 78 that is substantially parallel to and offset from the fixed housing axis 68 defined by the bearing portions 72 and 74 disposed in the journal boxes 64 and 66. Pulley 44 is disposed between journal boxes 64 and 66 and rotationally supported on circular cam 76 for rotation about the adjustable pulley axis 78.

Cam shaft 70 can be clamped in housing 62 in a variety of rotational positions about the fixed housing axis 68 of housing 62 to adjust the location of the adjustable pulley axis 78 with respect to housing 62 and the fixed housing axis 68. Pulley 42 at the lower end of the guide channel 24 rotates about a fixed pulley axis 80 that is fixed with respect to the guide channel 24 by the power unit bracket 51 and that preferably is substantially coplanar with end wall 45. Thus the adjustment of cam shaft 70 adjusts the location of the adjustable pulley axis 78 of pulley 44 with respect to the fixed pulley axis 80 of pulley 42 as explained further below.

Journal box 64 is an open journal box in the form of a generally C-shaped clamp while journal box 66 is preferably a closed journal box in the interests of design simplicity and manufacturing economy. Cam shaft 70 is also preferably shaped so that bearing portion 72 is larger than cam 76 which is turn is larger than bearing portion 74 so that cam 76 and bearing portion 74 can be inserted through journal box 64 to facilitate assembly of cam shaft 70 to housing 62.

Open journal box 64 also includes a lock 82 in the form of a screw or the like to clamp the journal box 64 into tight engagement with the bearing portion 72 to fix the rotational position of the cam shaft 70 in the housing 62. The surface of the bearing portion 72 is preferably knurled or otherwise roughened to enhance the clamping action of the journal box 64.

Figure 6:
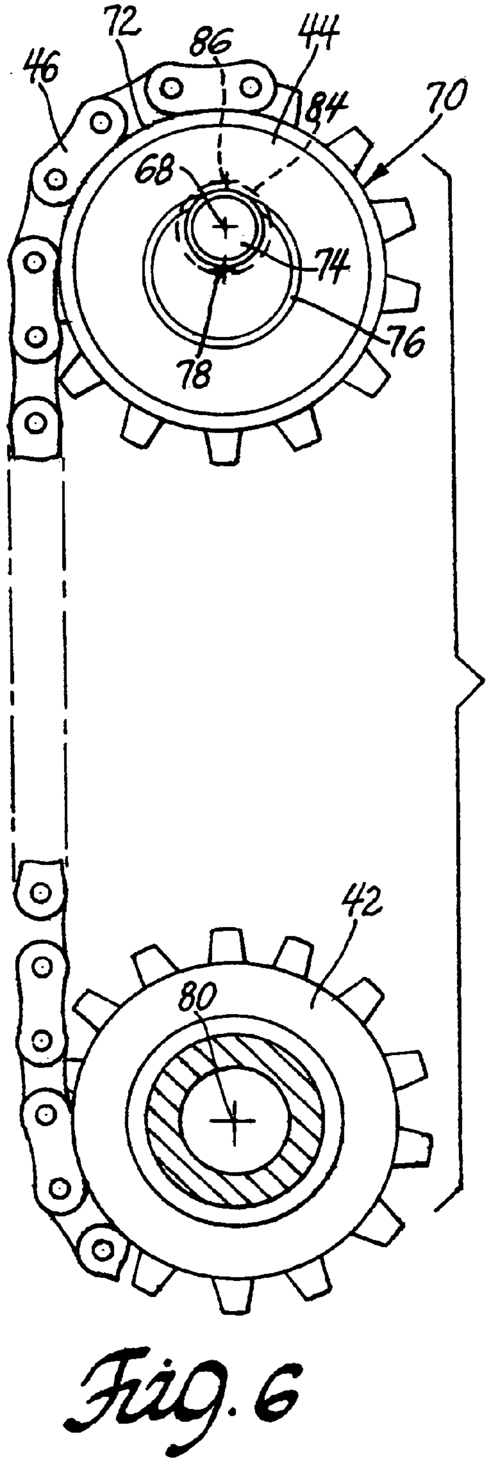
FIG. 6 is schematic view of the drive unit shown in FIG. 5.

When the drive unit 48 is assembled, the flexible drive member (drive chain) 46 may have slack due to manufacturing tolerances. This slack can be eliminated or at least substantially reduced by operation of the adjustable pulley assembly 60. Referring now to FIG. 6, the drive unit 48 is illustrated with the movable or adjustable pulley axis 78 at a minimum distance from the fixed pulley axis 80 where the adjustable pulley axis 78 lies between the fixed pulley axis 80 and the fixed housing axis 68. However, the adjustable pulley axis 78 can be moved anywhere in a fixed orbit or circle 84 around the fixed housing axis 68 by rotating the cam shaft 70 in the housing 62 about the fixed housing axis 68. Rotation of cam shaft 70 in either the clockwise direction or the counterclockwise direction increases the distance between the adjustable pulley axis 78 and the fixed pulley axis 80 thus reducing any slack in the flexible drive member 46. The maximum adjustment occurs when the adjustable pulley axis is located as shown at point 86 which is at a half turn or 180 degrees from the minimum distance position shown in FIG. 6. It should be noted that the amount of slack that can be taken up by the adjustable pulley assembly 60 is twice the diameter of the adjustment orbit 84 because slack is taken up in both portions of the loop of flexible drive member 46 between the pulleys 42 and 44 when the distance or length between the pulley axes 78 and 80 is increased. Thus substantial slack in flexible drive member 46 may be taken up even when flexible drive member 46 is engaged solely by pulleys 42 and 44. Additional slack or tensioning of the flexible drive member may be taken up by attachment assembly 30 that is disclosed and described in detail in co-pending patent application Ser. No. 11/221,499 filed Sep. 8, 2005.

Cam shaft 70 preferably includes a hexagonal or other non-circular socket portion 88 at one end to receive a tool (not shown) to rotate cam shaft 70 about the fixed housing axis 68 and adjust the position of the pulley axis 78. Cam shaft 70 and housing 62 also preferably include cooperating indicia to indicate the position of the adjustable pulley axis 78 with respect to the fixed housing axis 68, such as scribe lines 90 and 92.

Operation

The operation of the power operated closure system is as follows. When lift-gate 12 is in the closed position as shown in solid line in FIG. 1, attachment assembly 30 is at or near the bottom of the elongated slot 27 in guide channel 24 as best shown in FIG. 5. To open lift-gate 12, motor 49 and electromagnetic clutch 50 are energized to rotate lower pulley (drive sprocket) 42 clockwise as viewed in FIG. 5. This moves drive chain 46 counterclockwise in the loop defined by pulleys 42 and 44 and pulls attachment assembly 30 up in guide channel 24. As attachment assembly 30 is pulled up, lift-gate 12 is moved toward the open position by rod 34. Attachment assembly 30 is pulled up in guide channel 24 until lift-gate 12 is opened at which time assembly 30 is positioned at or near the top of elongated slot 27 in guide channel 24 as shown in phantom in FIG. 1. When lift-gate 12 is opened, a limit switch or the like is actuated to de-energize motor 49 and electromagnetic clutch 50.

The open lift-gate 12 shown in phantom in FIG. 1 is closed by energizing motor 49 and electromagnetic clutch 50 to rotate drive sprocket 42 counterclockwise as viewed in FIG. 5. This moves drive chain 46 counterclockwise in its loop and pulls attachment assembly 30 down in guide channel 24. As attachment assembly 30 is pulled down, lift-gate 12 is moved toward the closed position by rod 34. Attachment assembly 30 is pulled down in guide channel 24 until lift-gate 12 is closed at which time attachment assembly 30 is positioned at or near the bottom of elongated slot 27 in guide channel 24 as shown in FIGS. 5 and 6. When lift-gate 12 is closed, a limit switch or the like is actuated to de-energize motor 49 and electromagnetic clutch 50.

The electromagnetic clutch 50 is de-energized after the lift-gate 12 is opened or closed to facilitate manual opening and closing of the lift-gate 12 in the event of power failure. However, the electromagnetic clutch 50 can be eliminated so long as the bi-directional electric motor 49 can be back driven by manual movement of the lift-gate in the event of a power failure.

Figure 7:
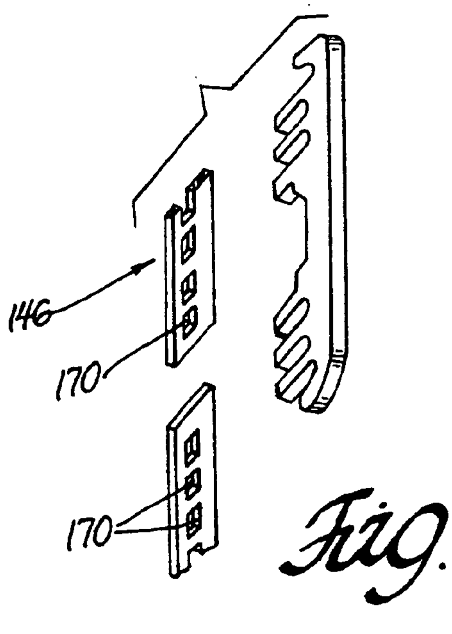
FIG. 7 is a perspective view of an alternate flexible drive member.

While the flexible drive member 46 is illustrated as being a drive chain 46, any flexible drive member can be used, such as a slotted drive tape 146 that is shown in FIG. 7. In such instances, pulleys 42 and 44 would be modified to cooperate with the slotted drive tape 46A.

Furthermore, while the adjustable pulley assembly 60 has been disclosed in connection with an idler pulley 44, the adjustable pulley assembly 60 can be used in connection with a drive pulley, such as the drive pulley 42, or with both the idler pulley 44 and the drive pulley 42. In other words, while the present invention has been described as carried out in a specific embodiment thereof, it is not intended to be limited thereby but is intended to cover the invention broadly within the scope and spirit of the appended claims.

We claim:

1. A drive unit, comprising:

a guide channel including a first journal housing and a second journal housing spaced a distance from the first journal housing to define an axis, the first journal housing having a generally C-shaped clamp with a gap and a threaded fastener engaging the C-shaped clamp on opposite sides of the gap, the second journal housing being a closed journal housing that is smaller than the first journal housing;

an attachment assembly moveably attached to the guide channel;

a flexible drive member attached to the attachment assembly and formed in a loop for moving the attachment assembly in the guide channel, characterized in that:

a first pulley and a second pulley each being secured to the flexible drive member wherein rotation of either the first or second pulley will cause the attachment assembly to move in the guide channel; and an adjustable pulley assembly for rotatably mounting either the first pulley or the second pulley, the adjustable pulley assembly comprising a cam shaft with a first bearing portion, a second bearing portion concentric with the first bearing portion, and a cam surface located between the first bearing portion and the second bearing portion, wherein the cam surface rotatably supports either the first pulley or the second pulley, the first bearing portion and the second bearing portion being rotatably mounted to the adjustable pulley assembly about a fixed axis and the cam surface has an axis offset from the fixed axis such that rotational movement of the cam shaft will relocate the axis of the cam surface and relocation of the axis of the cam surface adjusts a tension in the flexible drive member.

2. The drive unit as defined in claim 1 wherein the flexible drive member is engaged solely by the first and second pulleys to form the flexible drive member in a narrow loop and the drive unit is used for moving a lift gate of a vehicle.

3. A drive unit, comprising:

a guide channel including a first journal housing and a second journal housing spaced a distance from the first journal housing to define an axis, the first journal housing having a generally C-shaped clamp with a gap and a threaded fastener engaging the C-shaped clamp on opposite sides of the gap, the second journal housing being a closed journal housing that is smaller than the first journal housing;

an attachment assembly movably attached to the guide channel;

a flexible drive member attached to the attachment assembly and formed in a loop for moving the attachment assembly in the guide channel;

a first pulley secured to the guide channel; and an adjustable pulley assembly secured to the guide channel remote from the first pulley, the adjustable pulley assembly comprising a cam shaft with a first bearing portion, a second bearing portion concentric with the first bearing portion, and a cam surface located between the first bearing portion and the second bearing portion, wherein the cam surface rotatably supports a second pulley, the first bearing portion and the second bearing portion being rotatably mounted to the adjustable pulley assembly about a fixed axis and the cam surface has an axis offset from the fixed axis such that rotational movement of the cam shaft will relocated the axis of the cam surface and relocation of the axis of the cam surface adjusts a tension in the flexible drive member.

4. The drive unit of claim 3 wherein the first pulley is a drive pulley and the second pulley is an idler pulley and the drive unit is used for moving a lift gate of a vehicle.

5. The drive unit of claim 3, further comprising a power unit for rotating the first pulley.

6. The drive unit as in claim 3, wherein the first bearing portion, the second bearing portion and the cam surface each have a circular shape and the first bearing portion is larger than cam surface and the cam surface is larger than the second bearing portion and rotation of the cam shaft causes the axis of the cam surface to rotate around the fixed axis.

7. The drive unit of claim 3, wherein one of the axially spaced journal housings clamps the cam shaft in a fixed position.

8. An adjustable pulley assembly comprising:

a cam shaft having a first bearing portion, a second bearing portion concentric with the first bearing portion, and a cam surface located between the first bearing portion and the second bearing portion;

a housing having including a first journal housing and a second journal housing spaced a distance from the first journal housing to define a fixed axis, the first journal housing having a generally C-shaped clamp with a gap and a threaded fastener engaging the C-shaped clamp on opposite sides of the gap, the second journal housing being a closed journal housing that is smaller than the first journal housing, wherein the cam surface has an axis offset from the fixed axis such that rotational movement of the cam shaft will relocated the axis of the cam surface; and a pulley rotatably received on the cam surface.

9. The adjustable pulley assembly of claim 8, wherein one of the journal housings clamps the cam shaft in a fixed position.

10. The adjustable pulley assembly of claim 8 wherein the first bearing portion is larger than the cam surface and the cam surface is larger than the second bearing portion.

11. The adjustable pulley assembly of claim 10, wherein the first bearing portion is clamped in the fixed position.

12. The adjustable pulley assembly as defined in claim 8 wherein the cam surface is eccentric.

13. The adjustable pulley assembly as defined in claim 8 wherein the cam surface is circular.

14. The adjustable pulley assembly as defined in claim 11 wherein the cam shaft and housing have indicia to indicate the position of the cam shaft with respect to the housing.

15. The adjustable pulley assembly of claim 11 wherein the pulley is selected from the group consisting of a pulley and a drive pulley.

16. The drive unit as in claim 1, wherein the first bearing portion, the second bearing portion and the cam surface are integrally formed with the cam shaft.

17. The drive unit as in claim 16, wherein the first bearing portion, the second bearing portion and the cam surface are circular in shape and the first bearing portion has a larger diameter than the cam surface and the cam surface has a larger diameter than the second bearing portion.

* * * * *